(12) United States Patent
Kerver

(10) Patent No.: US 10,369,598 B2
(45) Date of Patent: Aug. 6, 2019

(54) WASTE SEPARATION METHOD

(71) Applicant: FiliGrade B.V., Twello (NL)

(72) Inventor: Johannes Bernardus Kerver, Eindhoven (NL)

(73) Assignee: FILIGRADE B.V., Twello (NL)

( * ) Notice: Subject to any disclaimer, the term of this patent is extended or adjusted under 35 U.S.C. 154(b) by 0 days.

(21) Appl. No.: 15/736,379

(22) PCT Filed: Jun. 17, 2016

(86) PCT No.: PCT/NL2016/050436
§ 371 (c)(1),
(2) Date: Dec. 14, 2017

(87) PCT Pub. No.: WO2016/204619
PCT Pub. Date: Dec. 22, 2016

(65) Prior Publication Data
US 2018/0345323 A1 Dec. 6, 2018

(30) Foreign Application Priority Data

Jun. 18, 2015 (NL) ..................................... 2014986

(51) Int. Cl.
*B07C 5/34* (2006.01)
*G06K 7/10* (2006.01)
(Continued)

(52) U.S. Cl.
CPC ........ *B07C 5/3412* (2013.01); *G06K 7/10712* (2013.01); *G06K 19/06037* (2013.01); *H04N 5/2256* (2013.01); *G06K 2019/06271* (2013.01)

(58) Field of Classification Search
CPC ......... G06K 7/10712; G06K 16/06037; G06K 2019/06271; B07C 5/3412
See application file for complete search history.

(56) References Cited

U.S. PATENT DOCUMENTS 4,601,395 A * 7/1986 Juvinall .................. B07C 5/126
209/526
4,644,151 A * 2/1987 Juvinall ................ B07C 5/3408
235/494
(Continued)

FOREIGN PATENT DOCUMENTS

DE 4330815 A1 3/1995
WO 2009/149765 A1 12/2009
(Continued)

*Primary Examiner* — Daniel I Walsh
(74) *Attorney, Agent, or Firm* — Hoffman & Baron, LLP

(57) ABSTRACT

A method of waste separation includes irradiating the waste by a source of radiation, capturing an image of the waste when irradiated by the source of radiation; where an item in the waste is provided with a pattern, the pattern being provided in or on a surface of the item, the pattern forming a repetition of dots, a code being stored in a sequence of adjacent ones of the dots, processing the image to detect the pattern; deriving the code from the sequence of adjacent ones of the dots of the pattern; separating in accordance with the code the item the pattern from the waste. The pattern may be a relief pattern. The relief pattern may comprise a pattern of bumps and recesses. The pattern, such as in a form of a relief, may also be applied to identify the item.

24 Claims, 9 Drawing Sheets

(51) Int. Cl.
*G06K 19/06* (2006.01)
*H04N 5/225* (2006.01)

(56) References Cited

U.S. PATENT DOCUMENTS

| | | | | |
|---|---|---|---|---|
| 4,691,231 A * | 9/1987 | Fitzmorris | ............ | B07C 5/3408 |
| | | | | 209/522 |
| 5,100,005 A * | 3/1992 | Noble | ............ | B07C 5/34 |
| | | | | 206/459.5 |
| 5,134,291 A * | 7/1992 | Ruhl, Jr. | ............ | B07C 5/342 |
| | | | | 209/587 |
| 5,150,307 A * | 9/1992 | McCourt | ............ | B07C 5/34 |
| | | | | 209/556 |
| 5,314,072 A * | 5/1994 | Frankel | ............ | B07C 5/3408 |
| | | | | 209/44.1 |
| 5,344,026 A * | 9/1994 | Booth | ............ | B07C 5/3416 |
| | | | | 209/580 |
| 5,628,409 A * | 5/1997 | Thomas | ............ | B07C 5/126 |
| | | | | 209/577 |
| 5,732,147 A * | 3/1998 | Tao | ............ | B07C 5/3422 |
| | | | | 348/89 |
| 6,060,677 A * | 5/2000 | Ulrichsen | ............ | B07C 5/342 |
| | | | | 209/577 |
| 7,543,735 B2 * | 6/2009 | Silver | ............ | G06Q 10/08 |
| | | | | 235/375 |
| 8,177,069 B2 * | 5/2012 | Valerio | ............ | B07C 5/3416 |
| | | | | 209/11 |
| 8,574,384 B1 * | 11/2013 | Lee | ............ | B07C 5/3408 |
| | | | | 156/378 |
| 9,120,131 B2 * | 9/2015 | Sundholm | ............ | B07C 5/3412 |
| 9,405,992 B2 * | 8/2016 | Badholm | ............ | B07C 5/3412 |
| 2002/0053975 A1 * | 5/2002 | Fitzgibbon | ............ | G07C 9/00182 |
| | | | | 340/541 |
| 2003/0015461 A1 * | 1/2003 | Miyamoto | ............ | B07C 5/02 |
| | | | | 209/577 |
| 2003/0057280 A1 * | 3/2003 | Mandile | ............ | G06K 13/07 |
| | | | | 235/454 |
| 2003/0141225 A1 * | 7/2003 | Liddle | ............ | B03B 5/28 |
| | | | | 209/18 |
| 2005/0065820 A1 | 3/2005 | Mallett et al. | | |
| 2006/0156029 A1 * | 7/2006 | Algazi | ............ | G06F 21/32 |
| | | | | 713/186 |
| 2006/0175232 A1 * | 8/2006 | Voloshyn | ............ | B03B 13/04 |
| | | | | 209/577 |
| 2006/0235769 A1 * | 10/2006 | Cheng | ............ | G06Q 10/08 |
| | | | | 705/28 |
| 2007/0029232 A1 * | 2/2007 | Cowling | ............ | B07C 5/3425 |
| | | | | 209/577 |
| 2007/0208455 A1 * | 9/2007 | Bollegraaf | ............ | B07C 5/36 |
| | | | | 700/223 |
| 2007/0278139 A1 * | 12/2007 | Cowling | ............ | B07C 5/36 |
| | | | | 209/606 |
| 2008/0104179 A1 * | 5/2008 | Agrawal | ............ | G06Q 10/107 |
| | | | | 709/206 |
| 2008/0154683 A1 * | 6/2008 | Kawada | ............ | G06Q 10/063 |
| | | | | 705/7.26 |
| 2008/0257793 A1 * | 10/2008 | Valerio | ............ | B07C 5/3416 |
| | | | | 209/567 |
| 2009/0306816 A1 * | 12/2009 | Champel | ............ | B07C 5/34 |
| | | | | 700/223 |
| 2010/0072114 A1 * | 3/2010 | Briane | ............ | B07C 5/3408 |
| | | | | 209/522 |
| 2010/0222917 A1 * | 9/2010 | Bohlig | ............ | B07C 5/3412 |
| | | | | 700/224 |
| 2011/0005977 A1 * | 1/2011 | Maggio | ............ | B07C 5/3412 |
| | | | | 209/2 |
| 2011/0238598 A1 * | 9/2011 | Borowski | ............ | G06Q 99/00 |
| | | | | 705/500 |
| 2013/0126399 A1 * | 5/2013 | Wolff | ............ | B07C 5/3425 |
| | | | | 209/555 |
| 2013/0180892 A1 * | 7/2013 | Marrapodi | ............ | B65F 1/0033 |
| | | | | 209/10 |
| 2013/0229510 A1 * | 9/2013 | Killmann | ............ | B07C 5/3416 |
| | | | | 348/91 |
| 2013/0334086 A1 | 12/2013 | Meadows et al. | | |
| 2014/0350718 A1 * | 11/2014 | Felse | ............ | B65G 43/08 |
| | | | | 700/225 |
| 2016/0077020 A1 * | 3/2016 | Leconte | ............ | B07C 5/3408 |
| | | | | 356/239.4 |
| 2016/0228920 A1 * | 8/2016 | Doublet | ............ | B07C 5/34 |
| 2016/0253856 A1 * | 9/2016 | Foucha | ............ | B07C 5/342 |
| | | | | 209/10 |
| 2016/0260050 A1 * | 9/2016 | Silver | ............ | G06Q 10/08 |
| 2016/0356726 A1 * | 12/2016 | Bathelet | ............ | B07C 5/126 |
| 2017/0174439 A1 * | 6/2017 | Ripley | ............ | B65G 43/08 |
| 2017/0225199 A1 * | 8/2017 | Koistinen | ............ | B65F 1/0006 |
| 2017/0232479 A1 * | 8/2017 | Pietzka | ............ | B07C 5/3412 |
| | | | | 209/3.3 |
| 2018/0001352 A1 * | 1/2018 | Huber | ............ | B07C 5/3427 |
| 2018/0345323 A1 * | 12/2018 | Kerver | ............ | B07C 5/3412 |

FOREIGN PATENT DOCUMENTS

WO WO-2009149765 A1 * 12/2009 ....... G06K 19/06037
WO 2015/001255 A1 1/2015

* cited by examiner

Fig. 3A
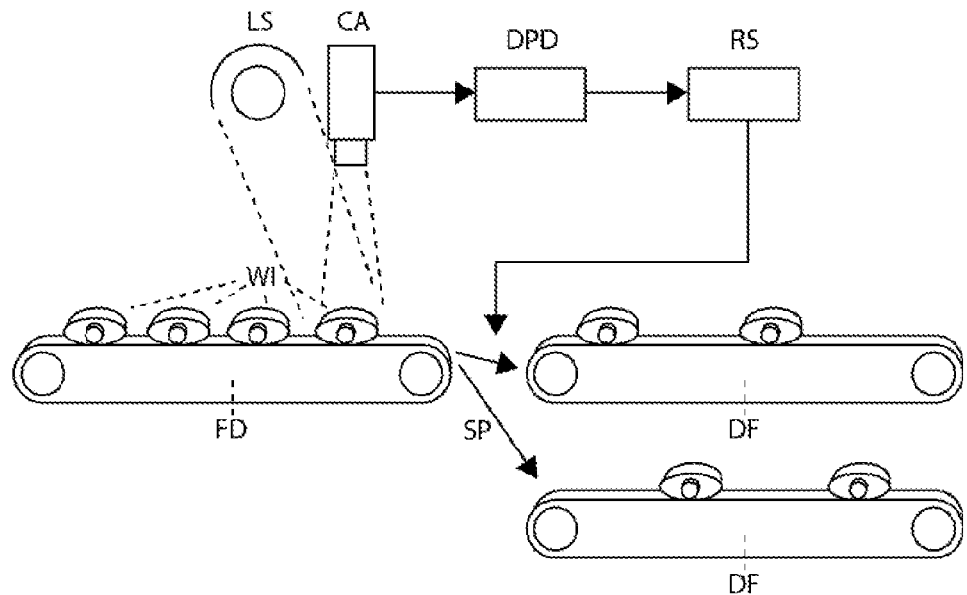
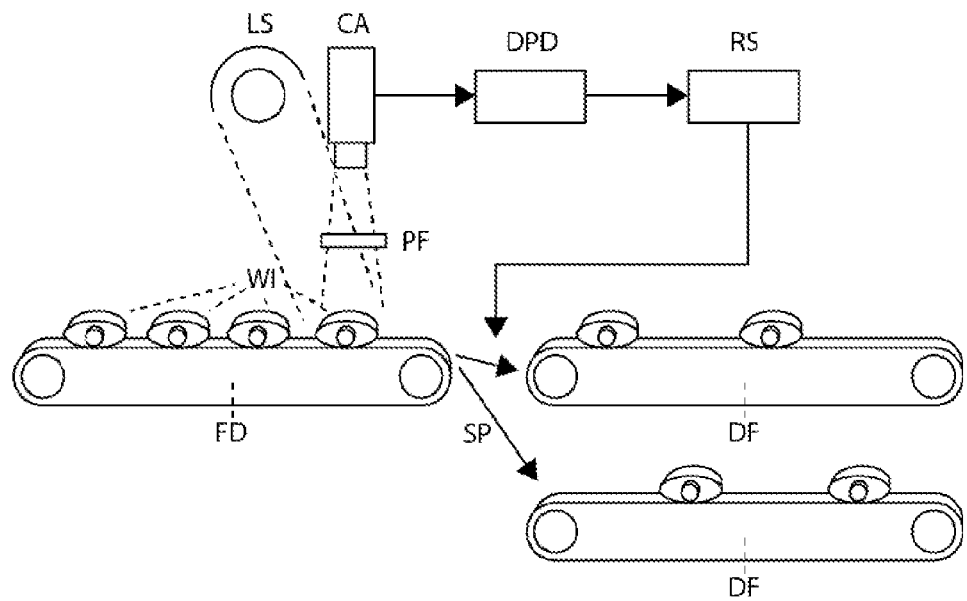
Fig. 3B

WM123456

150627 964 512 5668 4443 UK LDS EU 67 45 23 01 02

MLD

PA

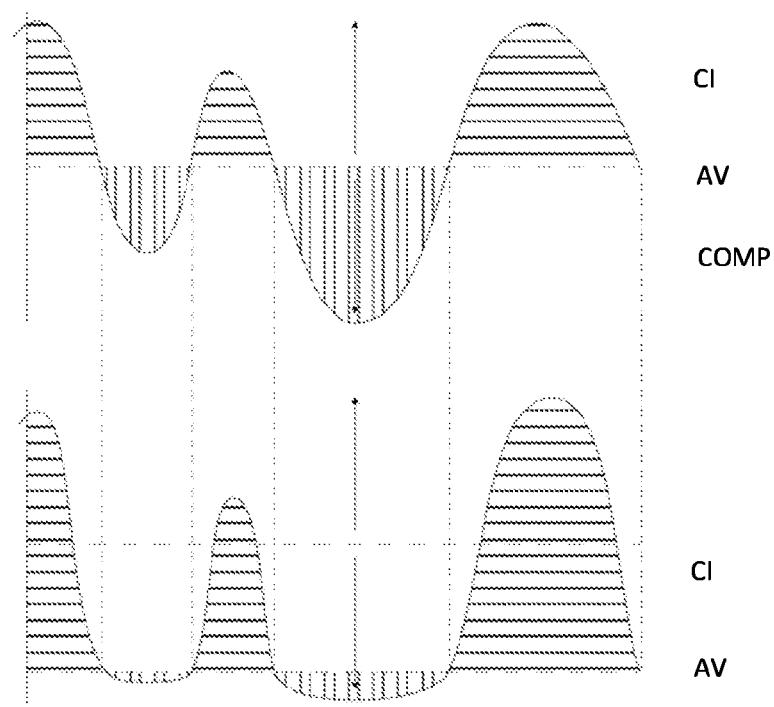

WASTE SEPARATION METHOD

CROSS-REFERENCE TO RELATED APPLICATIONS

This application is the National Stage of International Application No. PCT/NL2016/050436 filed Jun. 17, 2016, which claims the benefit of Netherlands Application No. NL 2014986, filed Jun. 18, 2015, the contents of which is incorporated by reference herein.

FIELD OF THE INVENTION

The invention relates to a method of waste separation. Furthermore, the invention relates to a method of manufacturing an item. Further, the invention relates to such an item. Still further, the invention relates to a mould for moulding an item. Also, the invention relates to a method of identifying an item.

BACKGROUND OF THE INVENTION

Consumer products are generally offered for sale in packages, the package may hold the item, protect the item during storage, enhance a visual presentation of the item, protect the item against aging, decay, etc. In particular food and beverage items are distributed in packages, such as bottles, blisters, trays, etc. Such packages provide for a large amount of waste materials as the package is used once and therefore considered rubbish once the food or beverage item has been consumed. Many approaches have been followed up to now in order to reduce overall amounts of rubbish. Two are briefly described below.

In many countries, deposit systems have been in use for packages such as bottles made of glass or plastic. When a consumer purchases the item, a deposit is charged for the package. When the consumer returns the empty package, the deposit is returned. Although re-use of the package or recycling of the package material may be provided by such a system, an overall efficiency is low, as the returned packages will require collection at the points of return (e.g. a supermarket deposit return station), sorting at the point of return, and return of the sorted packages to their thus providing for high transportation cost and logistic efforts. Furthermore, deposit systems may not be suitable or commercially feasible for all packages.

Another possibility is to provide collection bins where consumers can leave their empty packages. The collection bins may for example be provided per material category: paper, glass, plastics, etc. Further refined sorting may be provided by enlarging a number of collection bins in order to enable a more refined recollection: e.g. transparent glass, green glass, brown glass, paper, cardboard, textiles, batteries, shoes, etc. Although to some extent effective, this system still requires separate logistics streams for the selected items. Also, refined recollection schemes are virtually impossible to implement, as a consumer may not be able or willing to reliably and consistently distinguish and separate materials such as various plastic types (polyethylene, polypropylene, polystyrene, etc.) from each other. Firstly, the consumer cannot always distinguish such materials from each other. Secondly, a correspondingly large number of waste collection containers would consume a large space (e.g. in shopping malls, on parking lots, etc.). Thirdly, a recollection of a correspondingly large number of different materials would make the recollection process more complex hence less economical.

During production of e.g. consumable goods, a desire to recognize the package may also arise. For example, in a bottle filling process, whereby bottles, such as PET bottles or other packages are filled, a recognition of the type of package may be desired, in order to verify that a package is filled with its matching product.

SUMMARY OF THE INVENTION

An aspect of the invention intends to enable an improved waste separation.

In order to achieve this goal, according to an aspect of the invention, there is provided a method of waste separation, the method comprising:
irradiating the waste by a source of radiation,
capturing an image of the waste when irradiated by the source of radiation;
wherein an item in the waste is provided with a pattern, the pattern being provided in or on a surface of the item, the pattern forming, when irradiated by the source of radiation, a readable pattern, the pattern forming a repetition of dots, a code being stored in a sequence of adjacent ones of the dots,
processing the image to detect the pattern;
deriving the code from the sequence of adjacent ones of the dots of the pattern;
separating in accordance with the code the item comprising the pattern from the waste,
wherein the source of radiation provides floodlight irradiation along at least part of the surface of the item,
wherein each dot forms a bump or recess of the surface of the item, the floodlight irradiation along at least part of the surface of the item forming by the dots (bumps and/or recesses) an image of highlights and shades on the surface of the item,
wherein capturing the image of the waste when irradiated by the source of radiation comprises capturing the image of highlights and shades, and
wherein the code is derived from the captured image of highlights and shades.

The image may be a photographic image, such as an image taken by a camera. The photographic image may comprise a single picture, alternatively, the photographic image comprises a video file or video data stream, i.e. a motion picture file or data stream. The video file may for example be applied to detect items in a moving stream of waste, e.g. a stream of waste that is fed along the image capturing camera. Patterns may then be searched for in the image frames of the video. The photographic image may be a two dimensional image. Alternatively, the photographic image may be a 3 dimensional image, such as a stereoscopic image taken by two camera's that are spaced apart. A two dimensional image may allow a fast processing as a relatively simple, quickly process-able data format is used. Using a 3 dimensional image, a reliability and detectability of the pattern may be increased (such as in the case of the pattern forming a relief), as on the one hand such a (3 dimensional) pattern may be recognized more easily, and as on the other hand—in a stream of waste, including e.g. crushed packages—capturing the patterns from different viewing angles may increase a likelihood of detection. The photographic image may be a monochrome image or a colour image. A camera commonly comprises light sensitive elements that are responsive to different optical wavelength bands, e.g. to a red (R), green (G) and blue (B) optical wavelength band. Other wavelength bands may for example include infrared (IR) and/or ultraviolet (UV). An image from a single one of such wavelength bands may be used. Reflections may however obstruct a reading, i.e. a recognition of the patterns in the image. In order to reduce an effect of reflections, a wide wavelength range image may be detected (e.g. using the combined image from R, G and B pixels and possibly UV and IR sensitive pixels) whereby a filter may be applied in order to suppress a wavelength band in which reflections tend to occur. The filtering may be performed optically by a corresponding optical filter (such as a band stop filter) or may be performed electronically by removing or attenuating a signal from pixels that are sensitive in a to be suppressed wavelength band, from the image. For example, in case most of the reflections appear to take place in a blue wavelength band, the signal from the blue pixels may be attenuated or even removed from the image.

The source of radiation (such as the source emitting the floodlight) may emit any suitable radiation. For example, a spectrum such as a white light (daylight) spectrum may be applied. Alternatively, a narrowband irradiation may be applied, such as monochrome radiation. A plurality of such narrowband irradiation wavelengths may be applied, for example a combination or one or more primary colours Red, Green and Blue or a combination of one or more composite colours Cyan, Magenta, and Yellow. Also, use may be made of infrared or ultraviolet irradiation. Instead of or in addition to optical radiation, the source of irradiation may also emit any other suitable type of radiation, such as radio waves, etc. It will be understood that the (photographic) image as taken from the waste will be performed using an image sensor that is sensitive to a wavelength matching the wavelength(s) or wavelength range of the source of irradiation.

It will be understood that the image as taken from the waste may be an image taken by detecting irradiation as emitted by the source of radiation onto the waste. All wavelengths as emitted by the source of irradiation may be detected, or a subset, e.g. a wavelength sub-range. In case the source of irradiation emits radio waves, such as millimeter waves, the image may be created from the radio waves having interacted (e.g. reflected by) the waste.

The image may be taken per item (e.g. by feeding the waste items in a sequential stream to the image capturing camera), or batches of waste items may be imaged at a time. In case a plurality of waste items has been imaged at a time, the resulting image may be divided in a plurality of image parts, whereby a processing (pattern recognition) algorithm is applied on each of the image parts separately. The processing may be performed in parallel at parallel image processors or sequentially by a single image processor. The dividing of the image in image parts may be performed by dividing the image in 2 (horizontal or vertical) image parts, by dividing the image in 2 horizontal times 2 vertical image parts (i.e. 4 image parts), dividing the image in 3 horizontal times 3 vertical image parts (i.e. 9 image parts) or any other suitable division.

The waste may comprise any item, such as a package, e.g. a package of a consumable product. The (waste) item may be formed by any other (waste) item, such as but not limited to industrial waste, (bulk) packaging materials from logistic centres, or any other manufactured item etc. The waste item may comprise a item made of plastic material(s) such as a tray, a bottle, a foil, etc., an item made of glass, such as a bottle, a jar, etc., an item may be metal, such as a can or a lid, etc. The item may comprise any manufactured item comprising a solid (i.e. non-gas, non-liquid) material.

Also a selection per manufacturer or per type or kind of package or product can be done.

The processing of the image may comprise any suitable image processing technique, such as pattern recognition so as to recognize the pattern in the image of the waste items. Generally, recognition of the patterns may be improved by applying floodlight to the waste items during the image capturing. Thereby, a contrast of the photographic image may be enhanced.

The pattern may be a relief pattern. The term relief pattern is to be understood as a pattern that provides protrusions and/or recesses in a surface of the waste material. The relief pattern may be formed by any suitable pattern, such as a pattern of dots, a pattern of stripes, etc. The pattern may be a one bit pattern, a two bit pattern, or a more complex code. In the case of a one bit pattern, two modulation levels may be used in the pattern. In the base of a two bit pattern, four modulation levels may be used in the pattern. The modulation levels may be set in terms of profile (height, depth, transmissivity, reflectivity, polarisation sensitivity, etc. as described elsewhere in this document) The pattern may be provided with any code: information may be provided directly (i.e. un-coded) into the pattern. Alternatively, the information may be coded, using any suitable encoding technique. For example, information may be encoded using an algorithm provided by the company Digimark (US). Examples of other coding techniques may be a pseudo random noise code, or a Digimarc coding. Using for example a Digimarc coding, such coding may result in a pattern that may be repeated plural times next to each other. Repeating the code may be done using any coding: Any watermark that is repeatedly generated in adjacent parts of the pattern, e.g. 1-bit, 2-bit and more complex code can be used. The code provided in the pattern may non-encrypted, i.e. may be derivable from the pattern by anyone, i.e. without access restrictions. In another embodiment, the code may be provided in the pattern in an encrypted way. Thus, only when having a decryption key available, the code can be deciphered from the detected pattern. The pattern may be provided on an outside of the item, an inside of the item or both. Providing the relief pattern on the inside of the item may be particularly useful in case the item (i.e. the part where the relief is provided) is made from an at least partly transparent material, so that a relief at the inside is visible from the outside, while keeping a smooth, less contamination sensitive outside surface. The pattern may be formed by any other pattern. For example the pattern may be formed by a pattern expressed in terms of changes in transparency, changes in effects on polarisation of incident light, changes in opaqueness, etc. These patterns may be provided in the surface of the item in many ways. For example, an ink pattern may be injected into the surface of the package (e.g. after a material of the item has been brought at an elevated temperature so as to increase a plasticity thereof enabling the ink to locally merge into the material). As another example, the material of the item may be locally heated according to the pattern thereby (due to the local heating) locally changing a material property. The heating may for example provide for a change in polymer structure or crystal structure providing for a change in polarisation filtering, transparency. Other effects may occur, for example due to the local heating, a softening agent of a plastic material may evaporate locally, causing a local reduction in softening agent which correspondingly changes one or more of transparency, polarisation effects, opaqueness, etc. Furthermore, the pattern may be applied during a cooling process of the material of the item: for example, in case the item is made of a thermoplastic, the pattern may be provided in the material during cooling down by applying an additional cooling in the form of the pattern, thereby locally changing material properties as the rate of cooling locally deviates. In case a metal item, such as a metal bottle or an item provided with a metallized foil either on the inside or the outside, also the usage of a magnetic field or an electric field may be used to apply the pattern.

From the pattern as detected, a code is derived. The code provides information as to how the waste item is to be separated. The code may hence provide a criterion for separation of the waste item in question. In an embodiment, the data provided in the pattern is the code. Alternatively, the data (the code) provided in the pattern may form a pointer, e.g. a link towards the code or other information. Thereto, the data as retrieved from the pattern may e.g. be sent to a server or other database that retrieves waste separation information in the form of the code from the data as retrieved from the pattern. The code may be a single code. Alternatively, the code may comprise a data set (i.e. a set of codes) that e.g. each express a certain waste separation information, e.g. relating to one or more of the following: a date, month and/or year of production, a manufacturer identification code of the item, a manufacturer identification code of the contained product, a brand name, a brand owner, a country of production, a country of sale, a place of production, additions to the substrate, disclaimers, warnings, and more.

The separation of the waste item in accordance with the code (which may correspondingly be referred to as a waste separation code) may comprise a physical separation of the waste item, e.g. by a separator device. Alternatively or additionally, the separation may comprise counting the waste item: for example a plurality of counter values may be provided, e.g. per material type, per manufacturer, etc., whereby the detected code is used to increment a corresponding counter or corresponding counters in accordance with the code. For example, in case the code provides information that the waste item is made of polyethylene and originates from a certain manufacturer, the polyethylene counter and the manufacturer counter may both be incremented by one.

As the package is provided with a code, automatic detection of the waste items may be provided and the waste items may be separated accordingly. Thus, consumers or other users that generate the waste may simply collect the waste in one or a combined waste collection scheme, and the automatic waste separation in accordance with the invention may be used to separate the waste, e.g. at a central collection location once the waste has been recollected.

As the pattern forming a repetition of dots, a code being stored in a sequence of adjacent ones of the dots, information may be derived from the pattern to some extent irrespective of disturbing factors that may impede reading information, such as an orientation of the item, the item being crushed, wrinkled or otherwise damaged, etc. In such cases, some part of the pattern may be readable, and the information may be derived from adjacent dots in the readable part of the pattern. As the information is stored in a sequence of adjacent dots, the information may be repeated in the pattern plural times, thereby increasing redundancy. The fact that the code is stored in adjacent ones of the dots is to be understood as information being coded one—on—one in a bump, recess or combined bump/recess pattern. Alternative coding schemes may be used: for example, a differential coding is applied whereby similar shaped neighbouring dots express for example a zero bit while a difference in shape of neighbouring dots expresses a one bit of vice versa. The code may for example be stored in a sequence of 100 times 100 adjacent dots or a sequence of 256 times 256 adjacent dots. The larger the code, the larger the number of adjacent dots that may be required to store the code.

According to an aspect of the invention, the source of radiation makes use of floodlight, i.e. light having a direction of propagation which is almost parallel to the surface of the item, i.e. a propagation direction of the source of radiation having a small angle in respect of the surface of the item. For example the angle may be in a range of 1 to 30 degrees, preferably 3-15 degrees. The providing floodlight radiation along the surface of the item may hence be understood as providing irradiation at an angle of for example 1 to 30 degrees, preferable 3-15 degrees in respect of the surface of the item. The dots are coded as height deformations of the surface of the item. In other words, each dot provides for a deformation of the surface, whereby a degree of deformation depends on the value of the dot. For example, in 1 bit coding having two values, 0 or 1 per dot, each dot may have either a deformation associated with dot value 1 or a deformation associated with dot value 0. For example, the dots associated with value 1 are formed as a bump while the dots associated with 0 are formed as flat (no deformation) or as a recess. In another example, each dot is coded as a 2 bit coding, so that the dot may assume four values, coded as for example bumps of different height, different length/width seen along the surface, or a combination thereof. Also a combination of bumps and recesses may be applied, e.g. 2 (height and/or width) levels of bumps and 2 (height and or width) levels of recesses. As a result of the floodlight irradiation, the pattern of deformations results in highlights and shades on the surface of the item, namely shades at the trailing edges of the surface, i.e. where the deformation provided recesses on the surface of the item, seen along the direction of propagation of the floodlight. Similarly, at leading edges of the surface, seen along the direction of propagation of the floodlight, the intensity increases, hence providing a highlighting. The pattern of deformations hence results, due to the floodlight, in a image of highlights and shades. The image of highlights and shades (i.e. shadows) is, to a certain extent, representative of the pattern of deformations. For example, the higher a bump, the longer its associated shade may be, and the wider a bump, the wider its associated shade may be. A similar situation may arise for the highlights. The image of highlights and shades is then read out, for example by a camera. This may performed by directing an objective or image sensor of the camera to the surface, e.g. perpendicular to the surface or by detecting a reflection (in the reflection, the shades form dark parts and the highlights having increased intensity). The code may be derived from the highlights in the image (forming a pattern in the image), the shades in the image (forming a pattern in the image) or both highlights and shades. As both patterns should in principle correlate, deriving the code from both highlights and shades in the image may provide further redundancy in the read out. This use of floodlight and detecting the pattern from the image of highlights and/or shades resulting from the floodlight may be particularly useful when the item is made of a transparent material. In such case, a transmissive image may be difficult or even impossible to read out. This difficulty to read out may be aggravated in particular when the item is damaged (as may occur regularly in e.g. waste). Also, the use of floodlight and detecting the pattern from the shades resulting from the floodlight may be particularly useful when the pattern is monochrome, e.g. a monochrome surface of the item or a surface of the item having a colour scheme that is unrelated to the pattern to be detected, i.e.

when no colour and/or contrast may be coded to lay down the pattern, thus keeping the pattern of bumps and/or recesses less obtrusive. Thus, in circumstances where the pattern would otherwise be difficult to read (transparent, monochrome, etc.), the reading out the highlights and shades resulting from the deformations may nevertheless provide a good readability. In particular, a high contrast image may be achieved, when reading out the reflected image. Thereto, an image may be formed along a path of reflection of the floodlight. In case adjacent dots are spaced apart from each other, each dot may provide a corresponding highlight and/or shade associated with the dot, on the surface.

In case the surface of the item is formed by a wall, the bumps may be formed by an increase of a wall thickness of the item, or a corresponding recess may be formed at the other side of the wall, thereby e.g. keeping a thickness of the wall substantially constant. Similarly, a recess may be formed by a reduction of wall thickness or may be accompanied by a corresponding bump on the other side of the wall thereby e.g. keeping wall thickness substantially constant, In an embodiment, the dots of the pattern are coded into at least four different dot values, at least two of the dot values forming a code information dot value range, the remaining dot values forming a compensation dot value range, the dots having a dot value in the code information dot value range coding the code, the dots having dot values in the compensation dot value range balancing an average dot value of the pattern, a difference in deformation between dots having different dot values in the compensation dot value range being smaller than a difference in deformation between dots having different dot values in the code information dot value range. Patterns, such as digital patterns, e.g. by Digimarc® corporation (as referred to elsewhere in this document) as well as other digital patterns may make use of dots that express information relating to the code and dots that express compensation values. For example the dots that express information relating to the code may allow to derive the code therefrom, while disregarding the compensation dots. The compensation dots may for example be applied to balance grey values when applying such a pattern in an image. For example the dots that relate to the code may provide darker values, while the dots relating to the compensation may provide lighter values so as to compensate for the darker values thus providing that the average intensity does not change. When applying such a pattern to generate a relief in the surface of the item and generate a pattern of shades by means of floodlight irradiation, an improved readability may be obtained by compressing the deformation of the dots that relate to the compensation values, so as to use a larger range of the possible or allowed deformation for the purpose of the levels that relate to the code. As a result, the highlights and shades that are generated by the floodlight irradiation mostly relate to dots that express information relating to the code, while information from compensation dots (which may not be relevant in this application) may to a large part be suppressed.

In an embodiment, a maximum height deformation of the dots in the code information dot value range is truncated (e.g. having a flat top), thus to limit a maximum size change of the item by deformation.

In an embodiment, the pattern is a redundant code. In particular when separating waste, the item may be deformed, causing floodlight only to be incident at a suitable angle to generate highlights and shades, on a part of the pattern. Having redundancy, the code may be derived even from a part of the pattern.

Similarly, in case, the pattern repeats plural times on the surface of the item, information may be derived from parts of various ones of the repetitions and combined. When a part of one of the repetitions is unreadable, that part may be readable from another one of the repetitions, thus improving readability. Hence, fragments of (e.g. neighbouring) patterns may be read and the code may be derived from a combination of the fragments of the (e.g. neighbouring) patterns.

In case the surface of the item is curved, neighbouring patterns may be offset in respect of each other along a curvature of the surface of the item. Hence, in case one pattern or pattern part cannot be read due to the angle of incidence of the irradiation (e.g. not causing shades and/or highlights), due to the offset, a same part of another one of the patterns will—due to the curvature of the surface—be subject to a different angle of incidence of the irradiation, hence that fragment of the pattern may be detected from such offset pattern.

In an embodiment, a shape of the bumps and/or recesses (the dots) is symmetrical, seen along raster lines of the pattern, providing that the pattern (i.e. image) of highlights and shades will be less sensitive to an orientation of the item, which may improve a readability of the pattern when the item is randomly placed.

In an embodiment, a size of the bumps and/or recesses (the dots) is progressive to a value of the dot of the pattern. A a result, length, width and height (seen in respect of the surface) of the bump and/or recess may vary, causing that the shades tend to vary in two dimensions seen along the surface of the item, namely both in a direction of propagation of the floodlight as well as in a direction along the surface perpendicular to the direction of propagation of the floodlight.

In an embodiment, the sequence of adjacent ones of the dots is a pseudo random sequence. The dots may thereby for example form a pseudo random noise pattern, thus being unobtrusive to a human observer, as the patterns appears to be entirely random to a human observer and no information seems to be provided therein. The pseudo random noise pattern may have redundancy built into the coding of the pattern, thereby providing a good detectability of the code on the one hand and an unobtrusive appearance (as the pattern seems to be random) on the other hand. Many other patterns may be applied, for example a high frequency information pattern may be coded into the pattern of dots.

Various coding schemes may be used. For example the adjacent dots may be arranged at a constant mutual distance, the dots comprising at least two differently shaped dots, the code being stored in a sequencing of the differently shaped dots. Thus information is stored in a sequence of changing a property of the dots (the different shapes may e.g. comprise a different amplitude, a different outline, a different colour etc.). As another example, information may be stored in a distance between the adjacent dots. Thereby, the adjacent dots are arranged at a variable mutual distance, the code being stored in the variable mutual distance between the adjacent dots. The information may thus be stored in the sequence of adjacent dots by means of changes in dot form (e.g. amplitude, shape, transparency, height, etc.), mutual dot distance of adjacent ones of the dots, or a combination thereof.

In an embodiment, the sequence is a 2 dimensional sequence of a group of dots, the group comprising at least 100 times 100 dots, preferably at least 256 times 256 dots. Using groups of at least 100 times 100 dots to contain the code therein allows to store a relatively large code (e.g. in terms of bits) with sufficient redundancy (such as error correction, checksum, etc.) provided in the pattern. On the other hand, applying such sizes, the group of e.g. 100 times 100 dots will be sufficiently small to allow the code to be easily incorporated once or preferably repeatedly on the surface of the item. Currently, 256 times 256 dots are considered an optimum.

In an embodiment, the pattern comprises at least 10000, preferably at least 100000, more preferably at least 1000000 dots. In another embodiment, the pattern comprises at least 1024, preferably at least 4096, more preferably at least 8192 dots. Thus, sufficient pattern is available to store the code e.g. multiple times, allow redundancy and allow detecting of the code even when the item is damaged, rumpled, folded, or in part covered by other items in a stream of waste.

In an embodiment, the code comprises a pointer to further waste separation information. Thereto, the data as retrieved from the pattern may e.g. be sent to a server or other database that retrieves waste separation information in the form of the code from the data as retrieved from the pattern.

Furthermore, the further waste separation may be assigned as desired, enabling to assign, e.g. at a later stage after production of the item or during production, further information as desired.

In an embodiment, the code comprises at least one of a material type, a manufacturer identification code, a material safety code, a toxicity code and a material weight. As mentioned above, at least one of a date, a month and/or a year of production, a manufacturer identification code of the contained product, a brand name, a brand owner, a country of production, a country of sale, a place of production, additions to a substrate of the item, disclaimers and warnings may be included. The code may for example comprise a verification number such as a checksum, a manufacturer identification (e.g. 3 digits), a brand owner (e.g. 4 digits), a plastic type (e.g. 2 or 3 digits), and 2-3 digits additional information 01, 2-3 digits additional information 02, 2 digits reserve for future use.

In an embodiment, the pattern comprises a relief pattern. The dots may be formed by at least one of bumps and recesses. A pattern in 2D may be created as dots or pixels, either 1-bit or 2-bit or higher, In case of a relief pattern, this pattern is converted into a 3D pattern where the dots or pixels become bumps and/or recesses. In case of 2-bit or higher pixels or dots, the height of the bumps or depth of the recesses is related at the darkness of the pixels or dots of the 2D pattern. For example, a 2D-pattern (light or dark pixels or dots) is mapped on a 3D-object in dedicated software, where the darker dots become bumps and the lighter dots recesses or inverted, the darker dots become recesses and lighter dots become bumps The 2D pattern may for example be a non-random noise pattern or a high frequency pattern. The bumps and recesses need to be sufficient for reading with e.g. flood light but as low as possible to minimize the visual impact on the human eye. A second limitation is the maximal deformation the substrate (i.e. the surface of the item) allows without losing strength or other intrinsic values of the substrate.

In an embodiment, a pitch of neighboring bumps and recesses is at least 0.1 mm. The pitch may be in a range of 1 mm to 3 mm. The distance between neighboring bumps and recesses is dedicated to the deformation characteristics of the substrate and the reading distance of the camera in combination with the resolution of the camera. For PET-bottles its estimated between 1 mm and 3 mm as the optimal distance in relation to the readability and visual impact. Using higher resolution detection and more accurate moulding (e.g. injection moulding or injection blow moulding), a smaller pitch, such as a pitch as of 0.1 mm may be applied.

As set out above, in an embodiment, the pattern repeats the code plural times.

In an embodiment, the item is a package. Other objects that can be applicable are plastic and metal objects like airplane parts, car parts, machine parts and all other objects that might need selection in a waste or a production stream In an embodiment, the source of radiation comprises a polarized light source and the capturing the image of the waste comprises photographing the waste via a polarization filter. Using a polarized light source, i.e. a light source emitting polarized light onto the waste, the polarized light interacts with the (e.g. relief) pattern which may result in the relief pattern forming an optical pattern of light and dark, which may be distinguished more easily in the photographic image. Polarized light and/or applying a polarized light filter may tend to decrease reflections from other light sources and from internal reflections thus potentially influencing a quality of the reading In an embodiment, the source of radiation emits waves in a millimeter wavelength range, and the capturing the image of the waste comprises:

imaging the waste in a wavelength range of the millimeter wavelength. Millimeter wavelength waves tend to have other refraction characteristics then visible light, also interference of the pattern with this millimeter wavelength light is a characteristic in itself that may influence the readability. In an embodiment, a wavelength of approx. ⅔ of a pitch of the pattern, i.e. a distance between the bumps and recesses may provide for a high readability due to interference of the waves with the pattern)

A method of manufacturing a recyclable item, the method comprising:

providing a code representative of a recycling parameter of the item;

forming the code into a pattern, the pattern forming a repetition of dots, the code being stored in a sequence of adjacent ones of the dots;

manufacturing the item, wherein the pattern is provided on or in at least part of a surface of the item, wherein each dot forms a bump or recess of the surface of the item, the dots being configured to form an image of highlights and shades on at least part of the surface of the item when irradiated by floodlight irradiation, the code being derivable from the image of highlights and shades. The pattern may be brought into the surface of the item during the production of the item: for example when injection moulding or blow moulding the item, the pattern may be provided in e.g. a part of the mould. Alternatively, the pattern may be provided in the item as a further step after the item (without the pattern) has been manufactured, e.g. by pressing a mould or stamp profile onto a surface of the item. The mould or stamp may e.g. be heated. According to yet another aspect of the invention, there is provided an item, such as a package, comprising a pattern provided on or in a surface of at least part of the item, the pattern forming a repetition of dots, a code being stored in a sequence of adjacent ones of the dots, the code being representative of a recycling parameter of the item, wherein each dot forms a bump or recess of the surface of the item, the dots (bumps and/or recesses) being configured to form an image of highlights and shades on at least part of the surface of the item when irradiated by floodlight irradiation, the code being derivable from the image of highlights and shades.

In case the item is a bottle, such as a plastic bottle, the pattern may be provided on an entire outside surface of the bottle. In another embodiment, the pattern may form a ring around a circumference of the bottle. As another embodiment, the pattern is provided on a bottom of the bottle.

According to a yet further aspect of the invention, there is provided a mould for moulding an item, the mould being provided with a pattern to be moulded on or in a surface of at least part of the item, the pattern forming a repetition of dots, a code being stored in a sequence of adjacent ones of the dots, the code being representative of a recycling parameter of the item, wherein each dot forms a bump or recess of the surface of the item, the dots (bumps and/or recesses) being configured to form an image of highlights and shades on at least part of the surface of the item when irradiated by floodlight irradiation, the code being derivable from the image of highlights and shades. The mould may be a mould for injection moulding, a mould for injection blow moulding or any suitable technique.

With the method of manufacturing a recyclable item according to an aspect of the invention and with the item according to an aspect of the invention, an item is provided that may be used in the method of waste separation according to the invention. Accordingly, similar effects may be achieved as described with respect to the method of waste separation according to the invention. Likewise, similar preferred embodiments as described in the context of the method of waste separation may be provided in the method of manufacturing the recyclable item and the package according to the invention, whereby same of similar effects are achieved. The same applies to the mould according to the invention.

The techniques as described in this document may not only be applied for waste separation. The techniques may also be applied to identify the item, using a relief pattern whereby the dots are formed by for example bumps, recesses or both bumps and recesses in resp. on a surface of the item. Identifying the item from a relief pattern provided in or on a surface of the item allows the item to be identified, while preserving a visual appearance of the item, i.e. avoiding any disturbing code, such as a bar code or QR code or identification digits and or letters on the item. Furthermore, no label or other printed matter on the item may be required to identify the item, as the relief pattern may be provided in or on a surface of the item itself. Still further, as the relief pattern may exhibit a fine texture, it may be visually pleasing and/or unobtrusive to a human observer. Still further, the relief pattern may be provided on or in a relatively large part of the surface of the item, allowing a reliable identification irrespective of the orientation, distance, contamination of the item or possible damage to the item.

Accordingly, according to an aspect of the invention, there is provided a method of identifying an item, the method comprising:
irradiating the item by a source of radiation,
capturing an image of the item when irradiated by the source of radiation;
wherein the item is provided with a pattern, the pattern being provided in or on a surface of the item, the pattern forming a repetition of dots, an identification code being stored in a sequence of adjacent ones of the dots,
processing the image to detect the pattern;
deriving the identification code from the sequence of adjacent ones of the dots of the pattern; and
identifying the item from the identification code,
wherein the pattern comprises a relief pattern
wherein the source of radiation provides floodlight irradiation along at least part of the surface of the item,
wherein each dot forms a bump or recess of the surface of the item, the floodlight irradiation along at least part of the surface of the item forming by the dots (bumps and/or recesses) a pattern of highlights and shades on the surface of the item,
wherein capturing the image of the waste when irradiated by the source of radiation comprises capturing the pattern of highlights and shades, and
wherein the code is derived from the captured pattern of highlights and shades.

According to an aspect of the invention, there is provided a method of manufacturing an item, the method comprising: providing an identification code representative of an identification parameter of the item; forming the code into a pattern, the pattern forming a repetition of dots, the code being stored in a sequence of adjacent ones of the dots; manufacturing the item, wherein the pattern is provided on or in at least part of a surface of the item, wherein the pattern comprises a relief pattern, wherein each dot forms a bump or recess of the surface of the item, the dots (bumps and/or recesses) being configured to form an image of highlights and shades on at least part of the surface of the item when irradiated by floodlight irradiation, the code being derivable from the image of highlights and shades.

According to an aspect of the invention, there is provided an item, such as a package, comprising a pattern provided on or in a surface of at least part of the item, the pattern forming a repetition of dots, a code being stored in a sequence of adjacent ones of the dots, the code being representative of an identification parameter of the item, wherein the pattern comprises a relief pattern, wherein each dot forms a bump or recess of the surface of the item, the dots (bumps and/or recesses) being configured to form an image of highlights and shades on at least part of the surface of the item when irradiated by floodlight irradiation, the code being derivable from the image of highlights and shades.

According to an aspect of the invention, there is provided a mould for moulding an item, the mould being provided with a pattern to be moulded on or in a surface of at least part of the item, the pattern forming a repetition of dots, a code being stored in a sequence of adjacent ones of the dots, the code being representative of an identification parameter of the item, wherein the pattern comprises a relief pattern, wherein each dot forms a bump or recess of the surface of the item, the dots (bumps and/or recesses) being configured to form an image of highlights and shades on at least part of the surface of the item when irradiated by floodlight irradiation, the code being derivable from the image of highlights and shades.

It will be understood that the advantages, preferred embodiments etc. as described in this document in the context of waste separation, apply to the stated identification also, mutatis mutandis.

The identification code may be any identification code, and the identification code (and associated identification parameter, i.e. identification information) may provide information about a material type, a manufacturer, a package type/shape/model/size, a contents, a trademark, etc.

BRIEF DESCRIPTION OF THE DRAWINGS

Further advantages, features and effects of the invention will become apparent from the enclosed drawings and corresponding description relating to a non-limiting embodiment of the invention, wherein:

FIG. 3 depicts a waste separation device based on which the waste separation process will be explained;

FIGS. 11A and 11B depict a view of amplitude of a pattern versus position along an x-axis;

DETAILED DESCRIPTION OF THE INVENTION

Figure 1A:
FIGS. 1A and 1B depict examples of a product comprising a code.
Figure 1B:
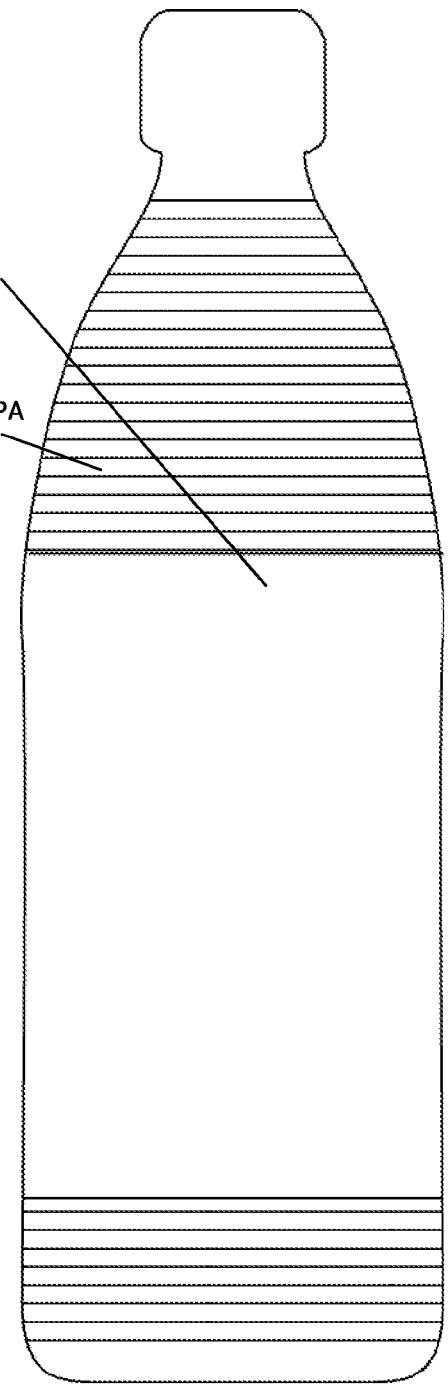

FIG. 1 depicts an item IT, such as a product, in this example a bottle made of Polyethylene (also abbreviated as PET). The bottle may be formed by transparent or at least partly transparent polyethylene, i.e. the material exhibiting some degree of transparency. In the present example, the outside surface of the bottle is provided with a relief pattern. Alternatively, a part of the bottle, such as a zone that extends around a circumference of the bottle, may be provided with a pattern PA, such as a relief pattern. The relief pattern forms a repetitive pattern that repeats itself in both circumferential as well as vertical direction. The patterns is formed by a relief in the surface of the bottle, in this example in the outside surface of the bottle. The pattern is formed by a repetition of dots, whereby dots either store a digital 1 or a digital zero, by being formed as a bump or a recess, respectively Instead of such as single bit pattern, multi-bit patterns may be applied, e.g. 2 bit patterns employing different bump and recess heights. The information in the pattern is stored in a sequencing of adjacent ones of the dots. The information stored in the pattern may form a waste separation code. It will be understood that for other purposes, such as identification purposes, the information stored in the patterns may comprise any suitable information, such as an identification code to identify the item. The waste separation code may for example comprise information about a material type, a manufacturer, a contents, a toxicity of the item or its contents, etc.

Figure 2A:
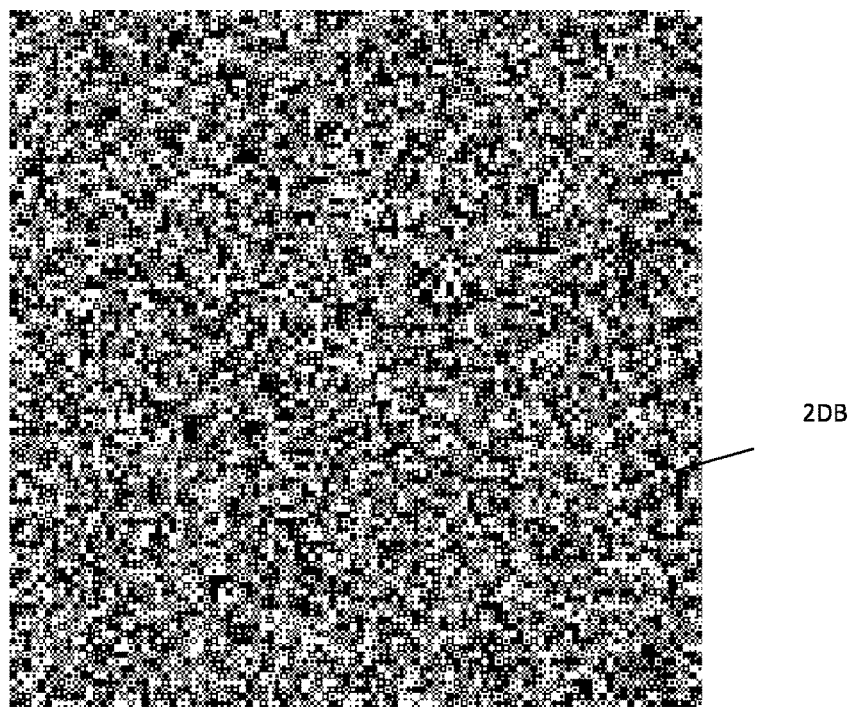
FIG. 2A depicts a detailed view of an embodiment of a code formed into a two dimensional sequence of bits.
Figure 2B:
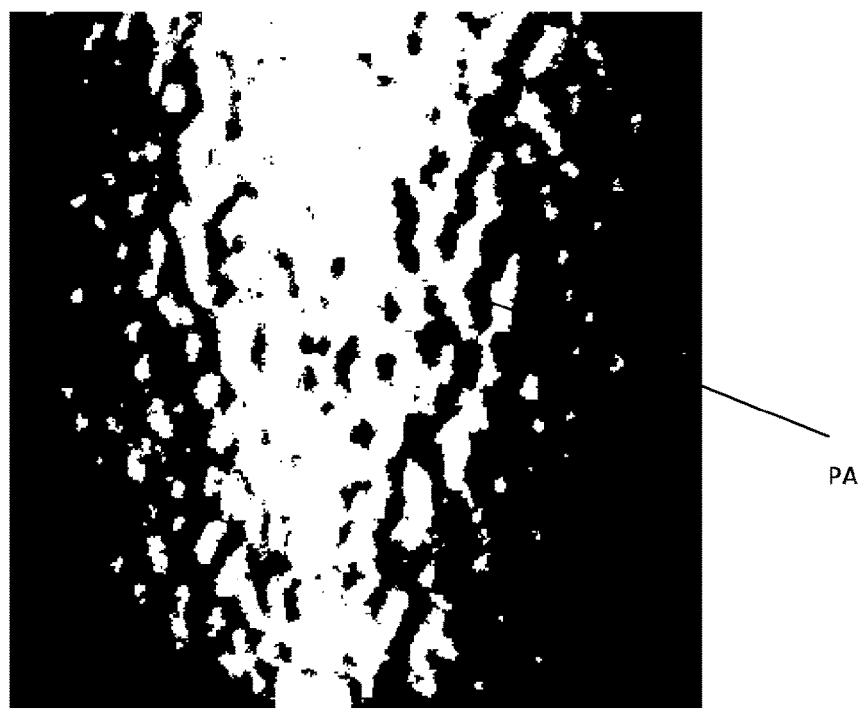
FIG. 2B depicts a view of an relief pattern derived from the two dimensional sequence of bits.

FIG. 2B depicts a detailed view of the pattern PA forming an relief and provided in a surface of the bottle as depicted in FIG. 1. The relief pattern is provided in a surface of the bottle, and is formed by a patterns of bumps (extrusions) and recesses (intrusions). In the present example of PET-bottles, the surface at the inside and the outside of the bottle are parallel, but it is not necessary, for a transparent bottle one side may be without bumps and/or recesses. Internal reflections in the material of the transparent bottle may have an effect on readability of the pattern. In particular when using polarized light, the differences between both options may not influence to much as polarized light may minimize the internal reflections.

The relief pattern may be designed as follows: first, a code that is to be stored in the item is taken as a starting point. The code may be supplemented by further information, such as a checksum to perform error correction. The code is then formed into a two dimensional bit (dot) sequence 2DB, as depicted in FIG. 2A, wherein black and white represent 0 and 1 bit values or vice versa. Any suitable coding software may be used to form the two dimensional bit (dot) sequence, for example, use may be made of coding software as supplied by Digimarc corporation. Then the two dimensional bit sequence is formed into a relief pattern by forming a bit value 1 as a bum and bit value 0 as a recess or vice versa. This, information is stored by means of differences in shape of the dots provided on the surface of the bottle. Alternatively, information may be stored in a varying of a mutual distance between the dots. For example, each dot forms a bump, whereby a placement of the bump in respect of its neighbours associates to a bit value of that dot.

The dots may be placed at any suitable pitch. For example, in order to facilitate reading by a camera having a commonly used resolution, a dot pitch in an order or magnitude of 1-3 millimeter may be applied. The radiation provided by the source of radiation may also be daylight or light from common electrical light sources in a visible wavelength band such as LED lighting, incandescent lighting, fluorescent lighting, etc. Using high accuracy image pickup, a pattern having a smaller dot pitch, e.g. a pitch of 0.1 millimeter or larger, may be applied. The dots may have any suitable shape, such as circular, oval, square, etc. Neighbouring dots may touch each other so as to create a continuous pattern giving a pleasant visual appearance to a human observer, or a spacing may be provided between adjacent dots which may provide that the dots are more easy readable. The dots may have any height profile, e.g. parabolic, circular, pyramidal, square, etc. The same applies to bumps. The pattern may be formed from bumps and flat dots, recesses and flat dots, bumps and recesses, or any other form. Using bumps and recesses, a high amplitude difference between dots having a bit value 1 and dots having a bit value 0 may be provided, thereby facilitating the pickup of an imaging of the pattern.

FIG. 3A depicts a waste separation device in accordance with an aspect of the invention. The waste separation device comprises a feeder FD (such as a conveyor belt) that feeds a stream of waste items WI. A camera CA is provided that takes a sequence of photographic images of the waste items while passing through a field of view of the camera. The camera thereby takes at least one photographic image of each waste item. In order to enhance a readability of the pattern, a source of radiation LS may emit radiation onto the waste. For example the source of radiation may be formed by a floodlight that emits floodlight in a visible light wavelength band to the waste. A visibility of the pattern may be enhanced thereby so as to facilitate detection of the pattern. A data processing device DPD is connected to the camera and receives the images as generated by the camera. The data processing device is provided with an image recognition that searches the images for the occurrence of relief patterns and generates an code CD (i.e. data coded into the relief pattern) corresponding to the relief pattern when having detected a relief pattern. Any suitable image recognition technique may be applied. For example, in the case of the encoding using the Digimarc software, the decoding may be performed by associated software. The code provided in the pattern may non-encrypted, i.e. may be derivable from the pattern by anyone, i.e. without access restrictions. In another embodiment, the code may be provided in the pattern in an encrypted way. Thus, only when having a decryption key available, the code can be deciphered from the detected pattern. In the present embodiment, the data processing device transmits the code to a recycling server RS. The recycling server derives recycling information relating to the particular relief pattern. For example the recycling server provides information as to a type of material, a manufacturing location, a toxicity code, etc. The material type in the present embodiment provides that the bottle is made of Polyethylene. The manufacturer location provides where the bottle originates from. The toxicity code may provide information about a type of product that was stored in the particular package (e.g. in case a potentially toxic product was distributed in the package, such as a cleaning agent, a pharmaceutical substance, a detergent, a solvent, etc.). In such as situation, special recycling may be required, to prevent that a residue of such as substance enters into the regular recycling process. Accordingly, the server provides a code WSC that comprises recycling information which translates the relief pattern into recycling information. Alternatively, the code itself may be provided in the relief pattern so that forwarding the code to the server may be omitted.

Based on the code, the waste item is separated by a separator SP downstream of the camera. The separator is connected to the data processing device and the server and correspondingly receives the code from the server. The separator in this embodiment comprises a selector, such as a mechanic selector, e.g. a selector flap that pushes the waste item towards a corresponding discharging opening. At each discharging opening, a corresponding collection bin or discharging feeder DF is provided to allow for a collection resp. a feeding of the separated waste items. Instead of using visible light to irradiate the waste, use may be made of any other suitable radiation. For example use may be made of millimeter waves. In order to detect the waves, instead of the above mentioned camera, a suitable detector for detecting millimeter waves may be used. FIG. 3B depicts a similar setup as depicted in FIG. 3A. Additionally, a polarization filter PF is provided in front of the camera so as to filters the image to be received by the camera. Furthermore, use may be made of a light source emitting polarized light, in combination with the detection of the image of the waste using the polarization filter. Thereby, using a polarization filter at the camera, possibly in combination with the source of radiation emitting polarized light, unwanted reflections may be filtered out providing an improved imaging.

Figure 4:
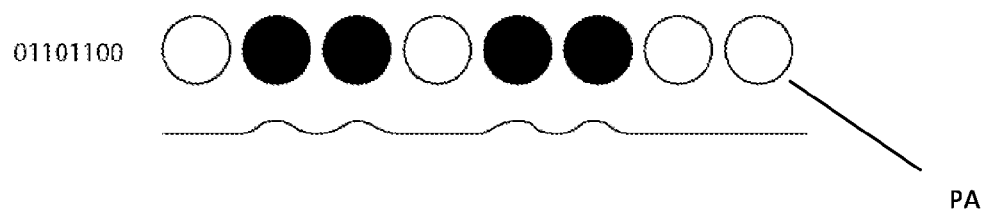
FIG. 4 depicts a schematic, detailed view pf a part of a pattern.

FIG. 4 depicts an example of a part of a pattern, namely a horizontal sequence of 8 dots, part of which are bumps (represented by black dots) and part of which are flat, represented by white dots. A cross sectional view being depicted in FIG. 4 for illustrative purposes. This example of a sequence of dots stores information, namely a binary sequence 01101100.

The code may be directly obtained from the dots. Thus, 01101100 may be or may form part of the stored code. Alternatively, any kind of encoding scheme may be used, such as a Digimarc encoding, a pseudo random noise encoding or any other suitable coding.

Figure 5:
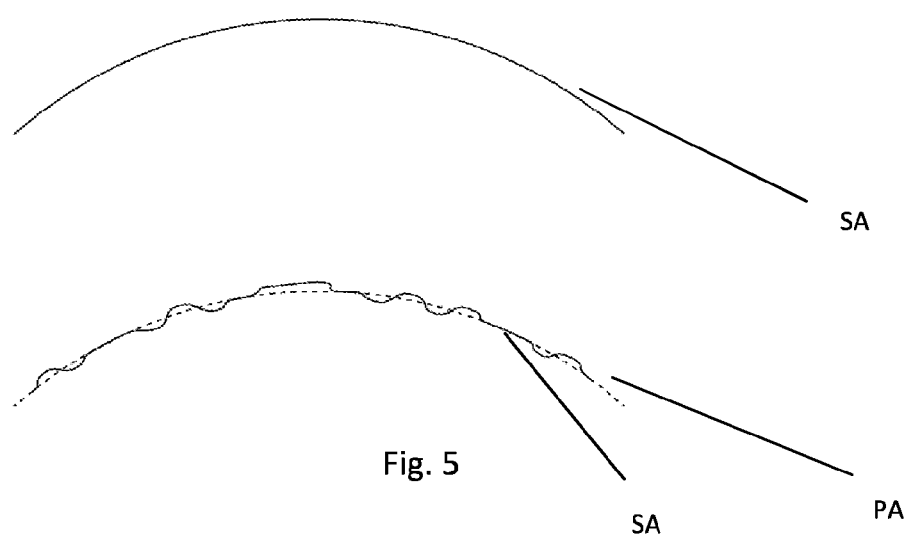
FIG. 5 depicts a schematic cross sectional view of a part of a surface of an item without respectively with pattern in accordance with an embodiment of the invention.

FIG. 5 schematically depicts how such a pattern may be provided on a surface SA of an item, such as a bottle. At a top side of FIG. 5, a part of a cross sectional view of a bottle is depicted, without pattern. At a bottom side of FIG. 5, a part of a cross sectional view of a bottle is depicted, with (a part of) a pattern PA.

Figure 6:
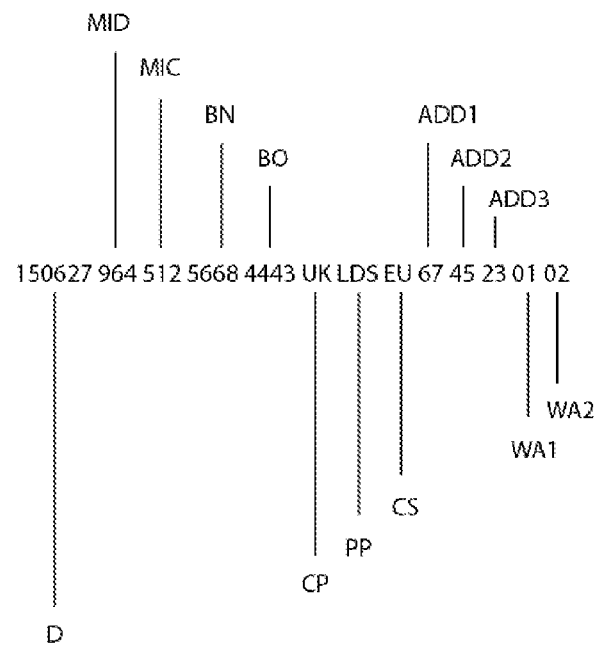
FIG. 6 depicts an example of a code in accordance with an embodiment of the invention.

FIG. 6 depicts an example of a code as may be stored in a pattern. The code in the present example comprises digit groups that provide information about Date D, Manufacturer of the item ID code MID, Manufacturer of a content of the item ID code MIC, Brand name BN, Brand owner BO, Country of production CP, Place of Production PP, Country of sale CS, Additions 1, 2, 3 ADD1, ADD2, ADD3 for future use, Warning 1 WA1, Warning 2 WA2. This code may be stored (directly or encoded) in the pattern. Alternatively, the pattern may contain a more brief code such as a watermark WM123456, which may be read from the pattern, decoded, sent to a server (such as recycling server RS in FIG. 3A) or other database (or otherwise) for obtaining the above code. In such as case, the code WM123456 as stored in the pattern forms a pointer to the above longer code. This may be useful to retrieve a large code (which would otherwise require large patterns to store the information directly in the pattern) from a smaller code a provided in the pattern.

Figure 7:
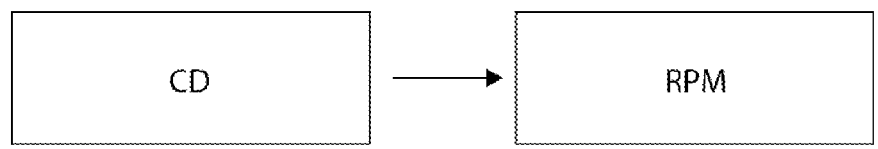
FIG. 7 schematically depicts a code and waste recycling parameter in accordance with embodiments of the invention.

FIG. 7 highly schematically depicts a recycling parameter RPM (exampled being described elsewhere in this document) derived from a code CD.

Figure 8:
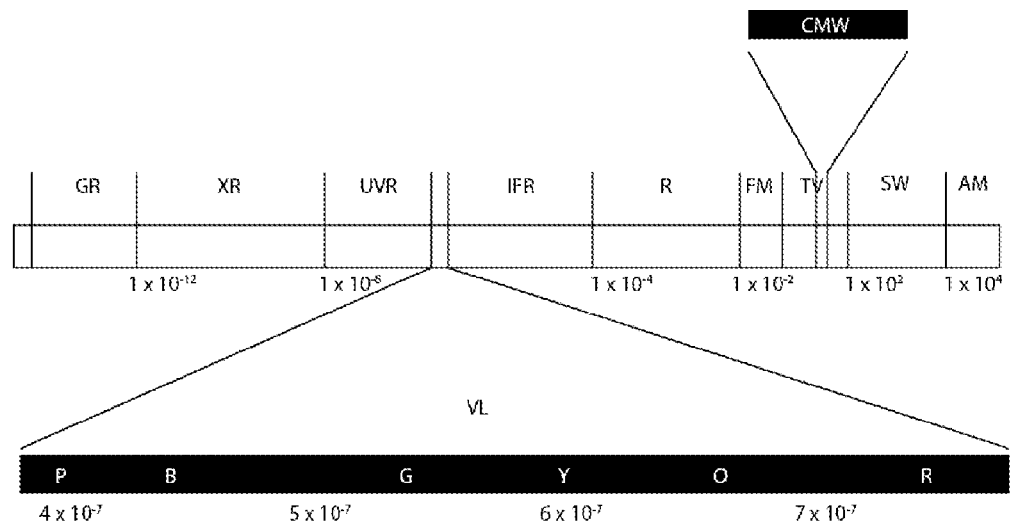
FIG. 8 depicts a spectrum to explain wavelengths possibly to be applied in embodiments of the invention.

FIG. 8 depicts a spectrum showing Gamma rays Gr, X-rays XR, Ultraviolet UVR, visible light VL, Infrared IFR, Radio waves including Radar R, FM waves FM, TV waves TV, Short waves SW and Amplitude Modulation AM radio wavelengths. Centimeter/Millimeter wavelengths CMW are indicated also. Any such wavelength may be used by the source of radiation. For example visible light, UV and IR have been referred to above. Millimeter/centimeter waves may be applied and provide a good detectability as their wavelength may be in a same order of magnitude as the pitch of the pattern.

Figure 9:
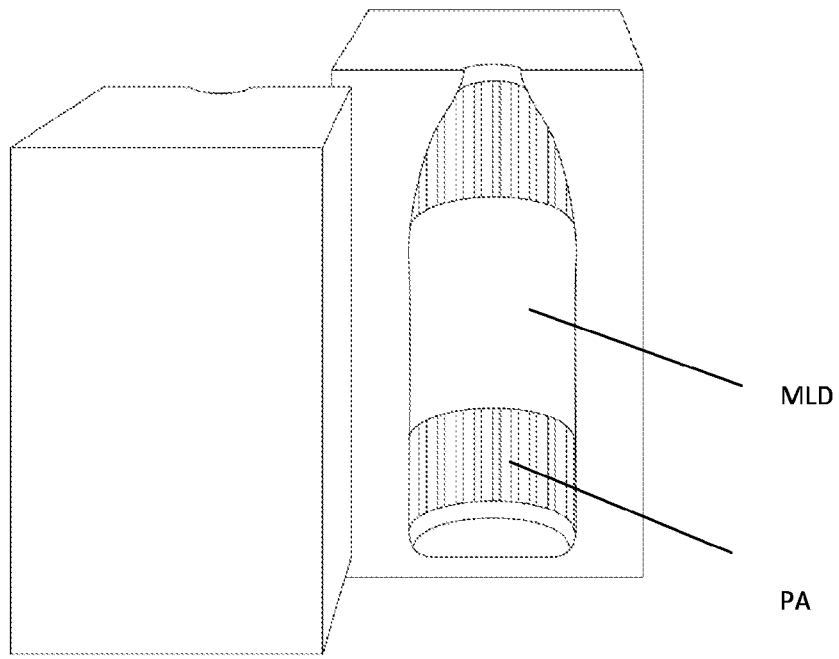
FIG. 9 depicts a schematic view of a mould according to an embodiment of the invention.

FIG. 9 depicts a mould MLD (such as an injection mould or blow injection mould) schematically indicating a part in which a pattern PA is provided. The pattern will be transferred onto a surface of the to be moulded item.

The techniques as described above may not only be used in the context of waste separation. Rather, the techniques may also be used to identify the item. For example, a relief pattern may be provided on an item and the relief pattern The item is irradiated the item by a source of radiation, an image of the item when irradiated by the source of radiation, is captured; as described, the item is provided with a pattern, the pattern being provided in or on a surface of the item, the pattern forming a repetition of dot. The identification code is stored in a sequence of adjacent ones of the dots, The image is processed to detect the pattern (e.g. using pattern recognition software);

The identification code is derived from the sequence of adjacent ones of the dots of the pattern. The item identified from the identification code. As mentioned, the pattern may comprise a relief pattern that forms a relief in or on a surface of the item. A set-up similar to that of FIG. 3 may be applied, however the selector may be omitted.

It is noted that the techniques as described in this document may apply to any item. The item may be a package, such as a package of a consumable, for example a bottle, a tray, a foil, a blister package, etc.

Figure 10A:
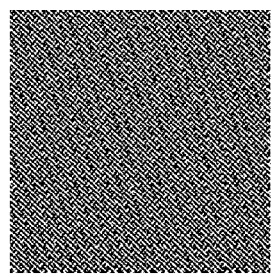
FIGS. 10A-10D depict patterns to illustrate successive steps of providing an item with a pattern, in accordance with aspects of the invention.
Figure 10B:
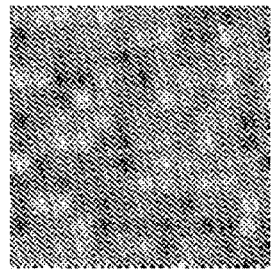

FIG. 10A depicts a print screen raster at 50% gray, without a pattern provided therein. FIG. 10B depicts the same print screen raster, however having a pattern superimposed thereon. The pattern comprises a raster of dots. Some of the dots have a higher grey level, thus being darker, while others have a lower grey level, thus being lighter. In the present example, the dots that are darker than the 50% grey level comprise information that codes the code, while the dots that are less dark than 50% grey level comprise compensation dots in order to average the intensity of the pattern back towards 50%.

Figure 10C:
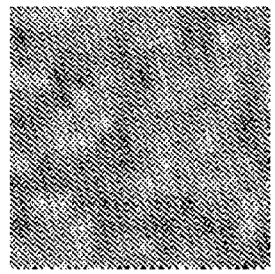
Figure 10D:
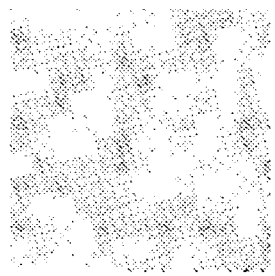

In FIG. 10C, a (e.g. Gaussian) blurring filter has been applied to smoothen the print screen raster in which the dots have been formed. In FIG. 10D, an average intensity of the pattern has been reduced, as will be explained in some more detail in respect of FIGS. 11A and 11B FIGS. 11A and 11B depicts a view of pattern intensity on the Y axis versus a position along the pattern on the x-axis. The pattern is superimposed on an average value AV of 50% grey, in accordance with FIGS. 10A and 10B. Hence, darker values above 50% are symbolized by the top parts of the curve and lighter values, below 50% are symbolized by the bottom parts of the curve. When using a code comprising code bit levels and compensation bit levels, the darker levels may for example comprise information from which the code can be derived, while the lighter parts comprise compensation bits to compensate an intensity level, thus bringing the average back to 50%. As the present example only aims to detect the code information, an asymmetry is provided, as depicted in FIG. 11B, where the average level, instead of 50% is brought to a low value (hence not being an average any more), thereby compressing the compensation range COMP, while increasing the code information range, CI, to emphasize code bits and compress compensation bits, thereby providing that a detectability of the code information may be improved. A resulting, lighter pattern is depicted in FIG. 10D.

Figure 12A:
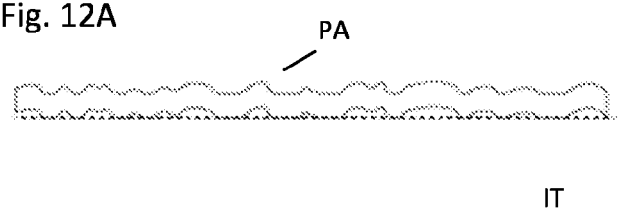
FIGS. 12A-12C illustrate a deriving of the image of highlights and shades by floodlight irradiation in accordance with aspects of the invention.
Figure 12B:
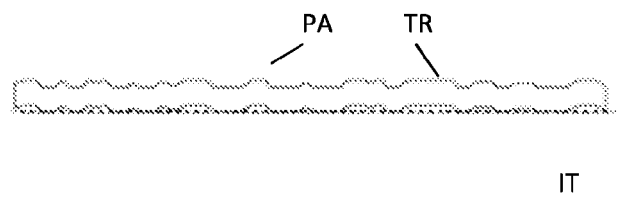
Figure 12C:
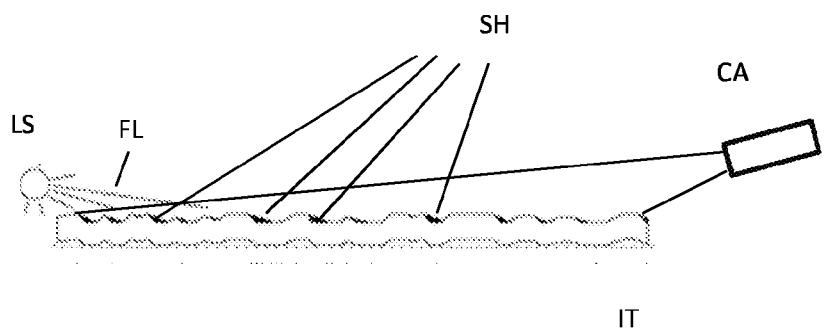

FIG. 12A depicts a cross sectional side view of a pattern PA of bumps and/or recesses as may be obtained in accordance with the method as described with reference to FIG. 10A-10D. The dotted line in FIGS. 12A-12C represents a lower surface of the non-deformed item: in the present example, deformation in one direction, namely the outward direction, is applied only. The higher a gray level of the dots of the pattern of FIG. 10D, the more deformation is provided for the corresponding dot in the surface of the item IT. In the present example, deformation is provided by deforming upwardly in the plane of drawing, which may e.g. correspond to outwardly in the case of an item such as a bottle. FIG. 12B depicts a similar cross sectional view, however in this case the deformation is truncated TR, causing the tops to be flattened at a level of truncation.

Figure 12D:
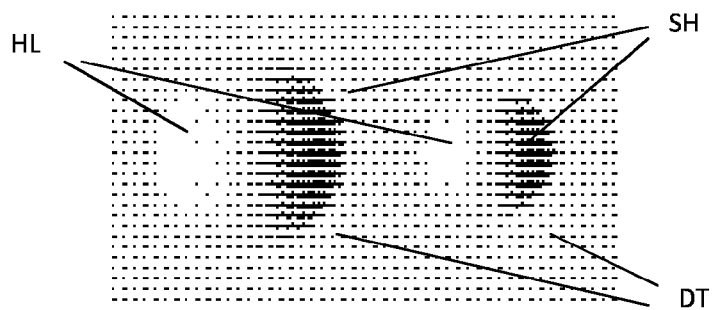
FIG. 12D illustrates a top view of a part of an image of highlights and shades in accordance with an aspect of the invention.

FIG. 12C again depicts a cross sectional side view of a pattern PA of item IT, irradiated by floodlight FL from light source LS. The floodlight may be formed by any sort of radiation, e.g. visible, infrared, UV. As a result of irradiating the pattern by the floodlight, shades SH will be generated on the surface of the item, in particular at trailing edges of the deformation (seen in the direction of propagation of the floodlight). Similarly, highlights are generated at the leading edges (leading edges as seen in the direction of propagation of the floodlight). Thus (as the pattern extends over a surface of the item) an image of highlights and shades is generated. The image of highlights and shades is detected by camera CA. In the present example, the camera is positioned to detect a reflection of the floodlight. Alternatively, a screen may be positioned at the location of the camera in FIG. 12C, and a camera be positioned to image a reflection pattern from the surface of the item, as reflected onto the screen. An another alternative, the camera may be positioned vertically over the item, similarly to the camera position in FIGS. 3A and 3B. Making use of reflection, a large contrast image may be obtained, thus being able to improve detectability. The image of highlights and shades reflects the dots of the pattern. An example of an image of 2 dots DT is provided in FIG. 12D. For the purpose of illustration, FIG. 12D depicts intensity values by means of raster points. For each dot, a highlight HL is depicted at a left side thereof, while a shade SH is depicted at a right side thereof (in the present example, floodlight would have been irradiated from the left side). As follows from FIG. 12D, the more deformation respectively the larger a deformation dot, the longer (seen in the direction of propagation of the floodlight) respectively the wider (seen perpendicular to the direction of propagation of the floodlight( ) the shade will be. A similar consideration applies to the highlights. Hence, information concerning size and shape of the deformation of a dot can be derived from the size and shape of the shade and highlights. Highlight and shade size correlate to dot dimensions. The camera receives an image comprising a pattern (i.e. image) of highlights and shades caused by the deformations of the surface of the item, the code being derived from the captured pattern of highlights, the pattern of shades or both. In case both highlights and shades would be applied for detecting the code, the highlights could for example be inversed and translated to coincide with the shades. This would provide that the highlights and shades can be added or correlated, which may result in an increase in signal to noise ratio.

The pattern of bumps and recesses may repeat plural times on the surface of the item, so that, in case of e.g. damage to parts of patterns or deformation, the code may be derived from a combination of fragments of neighbouring patterns. In particular, when the surface of the item is curved (such as in the case of the bottle depicted in FIGS. 1A and 1B, neighbouring patterns are offset in respect of each other along a curvature of the surface of the item, so that, when a part of a pattern is not readable due to e.g. angle of incidence of the floodlight, another pattern of part thereof will be at another angle of incidence, thus increasing a likelihood of detecting the code.

A shape of the bumps and/or recesses may be symmetrical, seen along raster lines of the pattern (the dots may form a raster along raster lines), so that the pattern of shades may be less tolerant to an angle of incidence of the irradiation, causing readability to be improved even when e.g. the item is oriented randomly. A size of the bumps and or recesses may progressive to a value of the dot of the pattern, enhancing that a size of the shade of the dots to be progressive to the value of the bump and/or recess thus to the values of the dot.

The invention claimed is:

1. A method of waste separation, the method comprising:
irradiating the waste on a feeding device by a source of radiation,
capturing an image of the waste when irradiated by the source of radiation;
wherein an item in the waste is provided with a optical relief pattern, the optical relief pattern being provided in or on a surface of the item, the optical relief pattern forming a repetition of dots, a code being stored in a sequence of adjacent ones of the dots,
processing the image to detect the optical relief pattern;
decoding the code from the sequence of adjacent ones of the dots of the optical relief pattern;

automatically separating into a storage, by a separating device, in accordance with the code, the item comprising the optical relief pattern from the waste, wherein the source of radiation provides floodlight irradiation along at least part of the surface of the item, wherein each dot forms a bump or recess of the surface of the item, the floodlight irradiation along at least part of the surface of the item forming by the dots an image of highlights and shades on the surface of the item, wherein capturing the image of the waste when irradiated by the source of radiation comprises capturing the image of highlights and shades, and wherein the code is derived from the captured image of highlights and shades and encodes information on how to perform the separating, and wherein the dots of the optical relief pattern are coded into at least four different dot values, at least two of the dot values forming a code information dot value range, the remaining dot values forming a compensation dot value range, the dots having a dot value in the code information dot value range coding the code, the dots having dot values in the compensation dot value range balancing an average dot value of the pattern, a difference in deformation between dots having different dot values in the compensation dot value range being smaller than a difference in deformation between dots having different dot values in the code information dot value range.

2. The method according to claim 1, wherein the floodlight irradiation irradiates at an acute angle in respect of the surface of the item.

3. The method according to claim 2, wherein the floodlight irradiation irradiates at an angle between 1 and 30 degrees in respect of the surface of the item, preferably between 3 and 15 degrees in respect of the surface of the item.

4. The method according to claim 1, wherein the dots form leading and trailing edges of the surface of the item, and wherein the floodlight irradiation provides, seen along a direction of irradiation, for shades at the trailing edges of the surface of the item and highlights at the leading edges of the surface of the item.

5. The method according to claim 1, wherein the relief pattern is provided on an inside surface of the item, the item having been made from an at least partly transparent material, causing the relief pattern to be visible from the outside.

6. The method according to claim 1, wherein plural items are imaged at a time, the image being divided in plural image parts.

7. The method according to claim 1, wherein a maximum height deformation of the dots in the code information dot value range is truncated.

8. The method according to claim 1, wherein the pattern is a redundant code.

9. The method according to claim 1, wherein the pattern repeats plural times on the surface of the item, the code being derived from a combination of fragments of neighbouring patterns.

10. The method according to claim 9, wherein the surface of the item is curved, neighbouring patterns are offset in respect of each other along a curvature of the surface of the item.

11. The method according to claim 1, wherein a shape of the bumps and/or recesses is symmetrical, seen along raster lines of the pattern.

12. The method according to claim 1, wherein a size of the bumps and/or recesses is progressive to a value of the dot of the pattern.

13. The method according to claim 1, wherein the sequence of adjacent ones of the dots is a pseudo random sequence.

14. The method according to 1, wherein the adjacent dots are arranged at a constant mutual distance, the dots comprising at least two differently shaped dots, the code being stored in a sequencing of the differently shaped dots.

15. The method according to claim 1, wherein the adjacent dots are arranged at a variable mutual distance, the code being stored in the variable mutual distance between the adjacent dots.

16. The method according to claim 1, wherein the sequence is a two dimensional sequence of a group of dots, the group comprising at least 100 times 100 dots, preferably at least 256 times 256 dots.

17. The method according to claim 1, wherein the pattern comprises at least 1024, preferably at least 4096, more preferably at least 8192 dots.

18. The method according to claim 1, wherein a pitch of the dots is at least 0.1 millimeters, preferably between 1 and 3 millimeters.

19. The method according to claim 1, wherein the code comprises a pointer to further waste separation information.

20. The method according to claim 1, wherein the code comprises at least one of a material type, a manufacturer identification code, a toxicity code and a material safety code.

21. The method according to claim 1, wherein the pattern comprises a relief pattern and wherein preferably the dots are formed by at least one of bumps and recesses.

22. The method according to claim 1, wherein the pattern repeats the code plural times.

23. The method according to claim 1, wherein the source of radiation comprises a polarized light source and wherein the capturing the image of the waste comprises:
photographing the waste via a polarization filter.

24. The method according to claim 1, wherein the source of radiation emits waves in a millimeter wavelength range, and wherein the capturing the image of the waste comprises:
imaging the waste in a wavelength range of the millimeter wavelength.

* * * * *